(12) United States Patent
Wells

(10) Patent No.: US 7,403,685 B2
(45) Date of Patent: Jul. 22, 2008

(54) OVERMOLD ZIP STRIP

(75) Inventor: Dennis Ray Wells, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/580,695

(22) Filed: Oct. 13, 2006

(65) Prior Publication Data
US 2008/0089652 A1    Apr. 17, 2008

(51) Int. Cl.
*G02B 6/00* (2006.01)
*G02B 6/44* (2006.01)

(52) U.S. Cl. .................... 385/100; 385/103; 385/110; 385/135

(58) Field of Classification Search ......... 385/100–114, 385/135, 136, 147
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Paget et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |

(Continued)

FOREIGN PATENT DOCUMENTS

DE    35 37 684 A1    4/1987

(Continued)

OTHER PUBLICATIONS

Exhibit A, "Cable Assemblies: Molding & Termination," http://www.dgo.com/prodcable.htm, 8 pages, (Copyright 2001).

(Continued)

*Primary Examiner*—Kevin S. Wood
(74) *Attorney, Agent, or Firm*—Merchant & Gould P.C.

(57) ABSTRACT

A telecommunications cable includes a distribution cable, a tether branching from the distribution cable at the mid-span breakout location, an enclosure that surrounds the breakout location, and an access device including a ripcord installed on the enclosure. Typically, the first and second ends of the ripcord are arranged adjacent the first end of the enclosure and a middle of the ripcord forms a half-loop adjacent the second end of the enclosure. The ripcord is configured to cut through the body of the enclosure when pulled from at least one of the first and second ends.

21 Claims, 9 Drawing Sheets

U.S. PATENT DOCUMENTS

| | | | |
|---|---|---|---|
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |
| 4,589,939 A | 5/1986 | Mohebban et al. | |
| 4,591,330 A | 5/1986 | Charlebois et al. | |
| 4,592,721 A | 6/1986 | Charlebois et al. | |
| 4,595,256 A | 6/1986 | Guazzo | |
| 4,609,773 A | 9/1986 | Brown et al. | |
| 4,625,073 A | 11/1986 | Breesch et al. | |
| 4,629,597 A | 12/1986 | Charlebois et al. | |
| 4,648,606 A | 3/1987 | Brown et al. | |
| 4,648,919 A | 3/1987 | Diaz et al. | |
| 4,654,474 A | 3/1987 | Charlebois et al. | |
| 4,666,537 A | 5/1987 | Dienes | |
| 4,670,069 A | 6/1987 | Debbaut et al. | |
| 4,670,980 A | 6/1987 | Charlebois et al. | |
| 4,678,866 A | 7/1987 | Charlebois | |
| 4,684,764 A | 8/1987 | Luzzi et al. | |
| 4,701,574 A | 10/1987 | Shimirak et al. | |
| 4,725,035 A | 2/1988 | Charlebois et al. | |
| 4,732,628 A | 3/1988 | Dienes | |
| 4,747,020 A | 5/1988 | Brickley et al. | |
| 4,761,052 A | 8/1988 | Buekers et al. | |
| 4,764,232 A | 8/1988 | Hunter | |
| 4,818,824 A | 4/1989 | Dixit et al. | |
| 4,822,434 A | 4/1989 | Sawaki et al. | |
| 4,875,952 A | 10/1989 | Mullin et al. | |
| 4,884,863 A | 12/1989 | Throckmorton | |
| 4,913,512 A | 4/1990 | Anderton | |
| 4,961,623 A | 10/1990 | Midkiff et al. | |
| 4,963,698 A | 10/1990 | Chang et al. | |
| 5,004,315 A | 4/1991 | Miyazaki | |
| 5,042,901 A | 8/1991 | Merriken et al. | |
| 5,046,811 A | 9/1991 | Jung et al. | |
| 5,054,868 A | 10/1991 | Hoban et al. | |
| 5,066,095 A | 11/1991 | Dekeyser et al. | |
| 5,074,808 A | 12/1991 | Beamenderfer et al. | |
| 5,097,529 A | 3/1992 | Cobb et al. | |
| 5,099,088 A | 3/1992 | Usami et al. | |
| 5,115,105 A | 5/1992 | Gallusser et al. | |
| 5,121,458 A | 6/1992 | Nilsson et al. | |
| 5,125,060 A | 6/1992 | Edmundson | |
| 5,185,844 A | 2/1993 | Bensel, III et al. | |
| 5,194,692 A | 3/1993 | Gallusser et al. | |
| 5,210,812 A | 5/1993 | Nilsson et al. | |
| 5,217,808 A | 6/1993 | Cobb | |
| 5,241,611 A | 8/1993 | Gould | |
| 5,245,151 A | 9/1993 | Chamberlain et al. | |
| 5,335,408 A | 8/1994 | Cobb | |
| 5,347,089 A | 9/1994 | Barrat et al. | |
| 5,353,367 A | 10/1994 | Czosnowski et al. | |
| 5,376,196 A | 12/1994 | Grajewski et al. | |
| 5,378,853 A | 1/1995 | Clouet et al. | |
| 5,394,502 A | 2/1995 | Caron | |
| 5,402,515 A | 3/1995 | Vidacovich et al. | |
| 5,410,105 A | 4/1995 | Tahara et al. | |
| RE34,955 E | 5/1995 | Anton et al. | |
| 5,420,958 A | 5/1995 | Henson et al. | |
| 5,440,665 A | 8/1995 | Ray et al. | |
| 5,442,726 A | 8/1995 | Howard et al. | |
| 5,450,517 A | 9/1995 | Essert | |
| 5,491,766 A | 2/1996 | Huynh et al. | |
| 5,509,202 A | 4/1996 | Abdow | |
| 5,517,592 A | 5/1996 | Grajewski et al. | |
| 5,528,718 A | 6/1996 | Ray et al. | |
| 5,657,413 A | 8/1997 | Ray et al. | |
| 5,666,453 A | 9/1997 | Dannenmann | |
| 5,684,911 A | 11/1997 | Burgett | |
| 5,696,864 A | 12/1997 | Smith et al. | |
| 5,734,776 A | 3/1998 | Puetz | |
| 5,767,448 A | 6/1998 | Dong | |
| 5,778,122 A | 7/1998 | Giebel et al. | |
| 5,823,646 A | 10/1998 | Arizpe et al. | |
| 5,825,963 A | 10/1998 | Burgett | |
| 5,892,870 A | 4/1999 | Fingler et al. | |
| 5,945,633 A | 8/1999 | Ott et al. | |
| 5,969,294 A | 10/1999 | Eberle et al. | |
| 5,997,186 A | 12/1999 | Huynh et al. | |
| RE36,592 E | 2/2000 | Giebel et al. | |
| 6,104,846 A | 8/2000 | Hodgson et al. | |
| RE37,028 E | 1/2001 | Cooke et al. | |
| 6,181,861 B1 | 1/2001 | Wenski et al. | |
| 6,215,930 B1 | 4/2001 | Estes et al. | |
| 6,255,584 B1 | 7/2001 | Renaud | |
| 6,376,774 B1 | 4/2002 | Oh et al. | |
| 6,407,338 B1 | 6/2002 | Smith | |
| 6,466,725 B2 | 10/2002 | Battey et al. | |
| 6,493,500 B1 | 12/2002 | Oh et al. | |
| 6,539,160 B2 | 3/2003 | Battey et al. | |
| 6,579,014 B2 | 6/2003 | Melton et al. | |
| 6,619,697 B2 | 9/2003 | Griffioen et al. | |
| 6,621,975 B2 | 9/2003 | Laporte et al. | |
| 6,648,520 B2 | 11/2003 | McDonald et al. | |
| 6,655,016 B2 | 12/2003 | Renaud | |
| 6,668,127 B1 | 12/2003 | Mahony | |
| 6,706,968 B2 | 3/2004 | Yaworski et al. | |
| 6,764,220 B2 | 7/2004 | Griffiths et al. | |
| 6,810,194 B2 | 10/2004 | Griffiths et al. | |
| 6,819,842 B1 | 11/2004 | Vogel et al. | |
| 6,856,748 B1 | 2/2005 | Elkins, II et al. | |
| 6,880,219 B2 | 4/2005 | Griffioen et al. | |
| 7,006,739 B2 | 2/2006 | Elkins, II et al. | |
| 7,016,592 B2 | 3/2006 | Elkins, II et al. | |
| 7,242,841 B2 * | 7/2007 | Greenwood et al. | 385/137 |
| 7,251,411 B1 * | 7/2007 | Lu et al. | 385/147 |
| 7,266,274 B2 * | 9/2007 | Elkins et al. | 385/100 |
| 7,272,283 B2 * | 9/2007 | Temple et al. | 385/114 |
| 7,289,714 B1 * | 10/2007 | Wells | 385/135 |
| 2004/0074852 A1 | 4/2004 | Knudsen et al. | |
| 2004/0228589 A1 | 11/2004 | Melton et al. | |
| 2004/0247265 A1 | 12/2004 | Takano et al. | |
| 2005/0053342 A1 | 3/2005 | Melton et al. | |
| 2005/0069275 A1 | 3/2005 | Brants et al. | |
| 2005/0111799 A1 | 5/2005 | Cooke et al. | |
| 2005/0111800 A1 | 5/2005 | Cooke et al. | |
| 2005/0175308 A1 | 8/2005 | Elkins, II et al. | |
| 2005/0259928 A1 | 11/2005 | Elkins, II et al. | |
| 2005/0259929 A1 | 11/2005 | Elkins, II et al. | |
| 2005/0259930 A1 | 11/2005 | Elkins, II et al. | |
| 2005/0276552 A1 | 12/2005 | Cooke et al. | |
| 2006/0056782 A1 | 3/2006 | Elkins, II et al. | |

FOREIGN PATENT DOCUMENTS

| | | |
|---|---|---|
| EP | 0 115 725 A1 | 8/1984 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-116968 | 4/2001 |
| WO | WO 2005/119322 A1 | 12/2005 |

WO  WO 2006/044080 A1  4/2006

OTHER PUBLICATIONS

Exhibit B, "DAM/BLOK™ Electrical Splice Kit," http://www.pmiind.com/products/damblok.html, 2 pages (Copyright 2000).

Exhibit C, "Factory Installed Termination System for Fiber Optic Cable Splices," 1 page (admitted as prior art as of Oct. 13, 2006).

Exhibit D, "Installation Instructions for Pre-Connected MIC® Cable (2-6 Fiber) Equipped with Plug & Play™ Systems Pulling Grips," *Corning Cable Systems*, Issue 7, pp. 1-3 (Jul. 2001).

Exhibit E, "Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

* cited by examiner

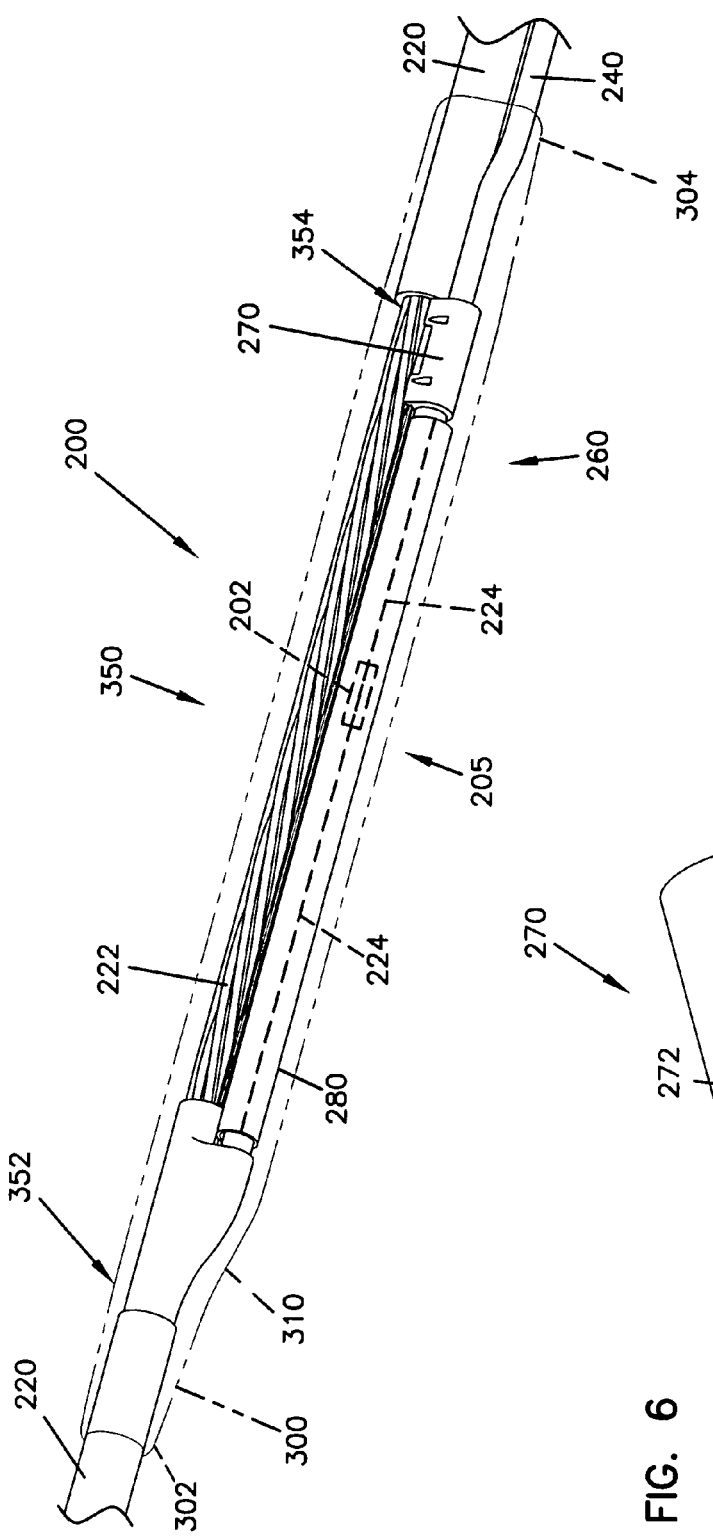
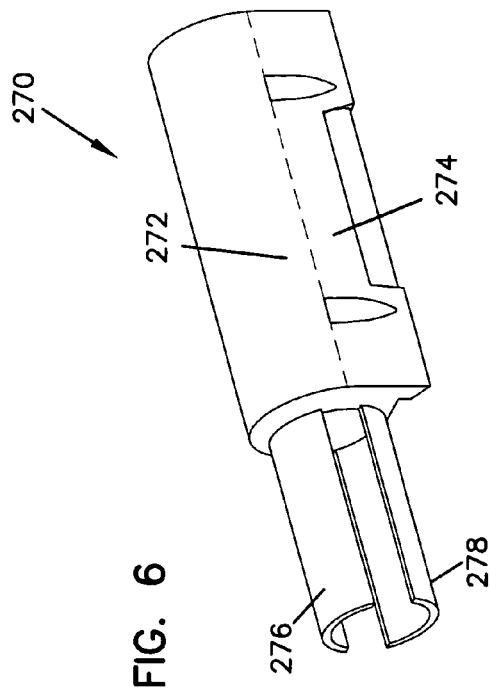
FIG. 5
FIG. 6

OVERMOLD ZIP STRIP

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations Branch cables can manually be separated out from a main cable in the field using field splices. Field splices are typically housed within sealed splice enclosures. Manual splicing in the field is time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). However, the installation of pre-terminated cables can be difficult. For example, for underground applications, pre-terminations can complicate passing pre-terminated cable through the underground conduit typically used to hold fiber optic cable (e.g., 1.25 inch inner diameter conduit). Similarly, for aerial applications, pre-terminations can complicate passing pre-terminated cable through aerial cable retention loops.

SUMMARY

Certain aspects of the disclosure relate to mid-span breakout configurations for pre-terminated fiber optic distribution cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 5 is a perspective view of an example breakout assembly installed on a distribution cable at breakout location;

FIG. 6 is a perspective view of an example retention block used at the mid-span breakout location of FIG. 5;

DETAILED DESCRIPTION

The present disclosure relates to mid-span breakout arrangements provided on distribution cables. Each breakout arrangement is provided at a breakout location to protect the optical coupling of a tether to the distribution cable.

Figure 1:
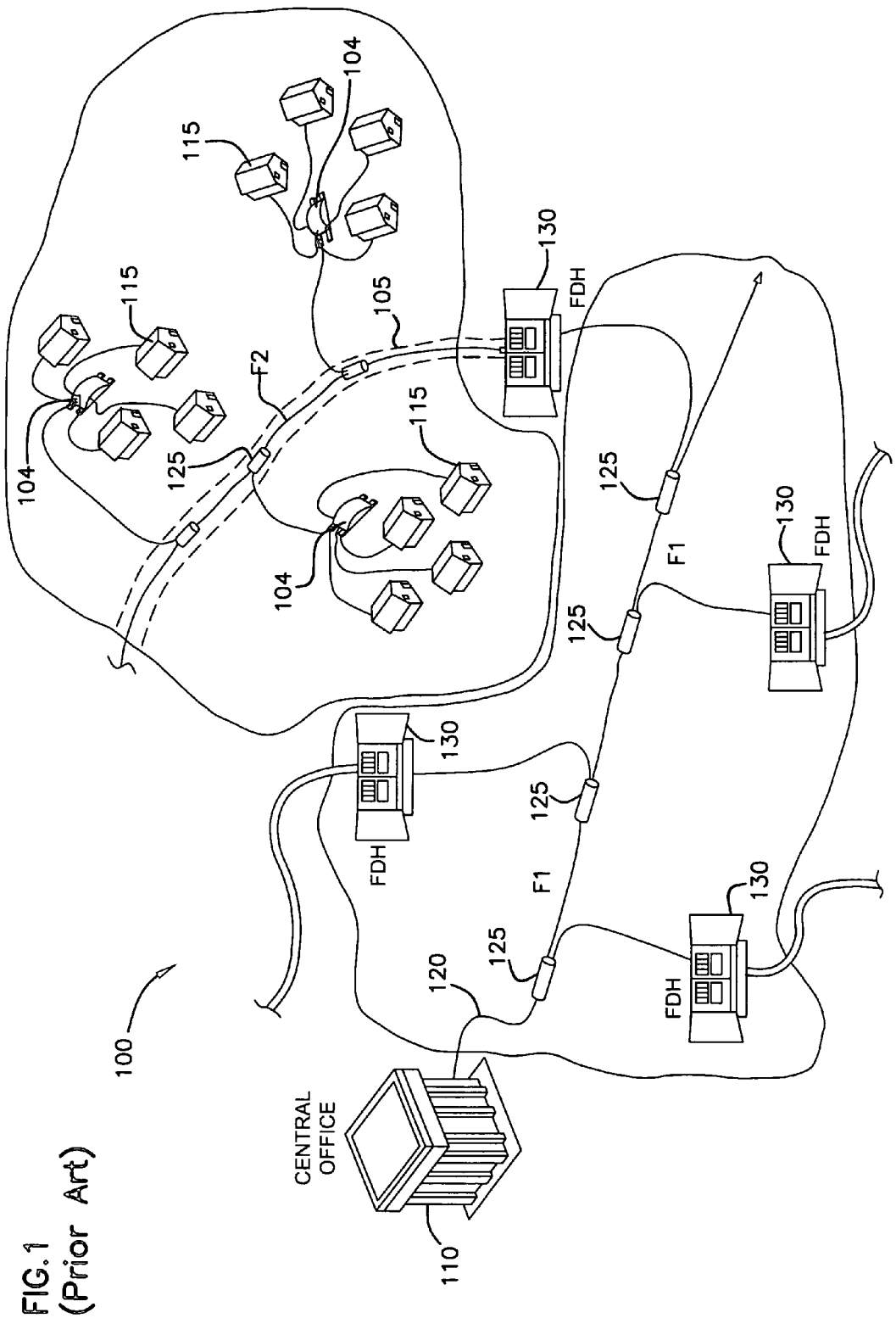
FIG. 1 shows a prior art passive fiber optic network.
Figure 2:
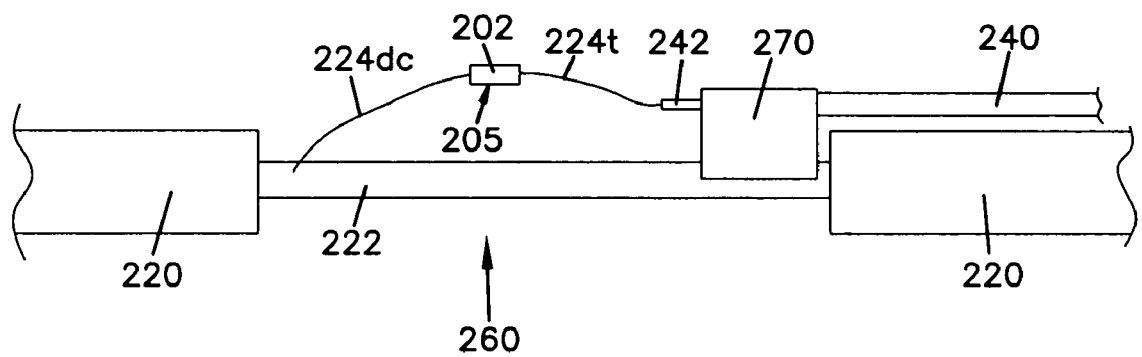
FIG. 2 is a side view of a tether branching from a distribution cable.

Referring now to the figures in general, a typical breakout location 260 is provided at an intermediate point along the length of a distribution cable 220 (e.g., see FIG. 2). A typical distribution cable includes a relatively large number of fibers (e.g., 72, 144 or more fibers). The fibers are typically segregated into separate groups with each group contained within a separate buffer tube. The fibers within each buffer tube can include either ribbon fibers or loose fibers.

Figure 3:
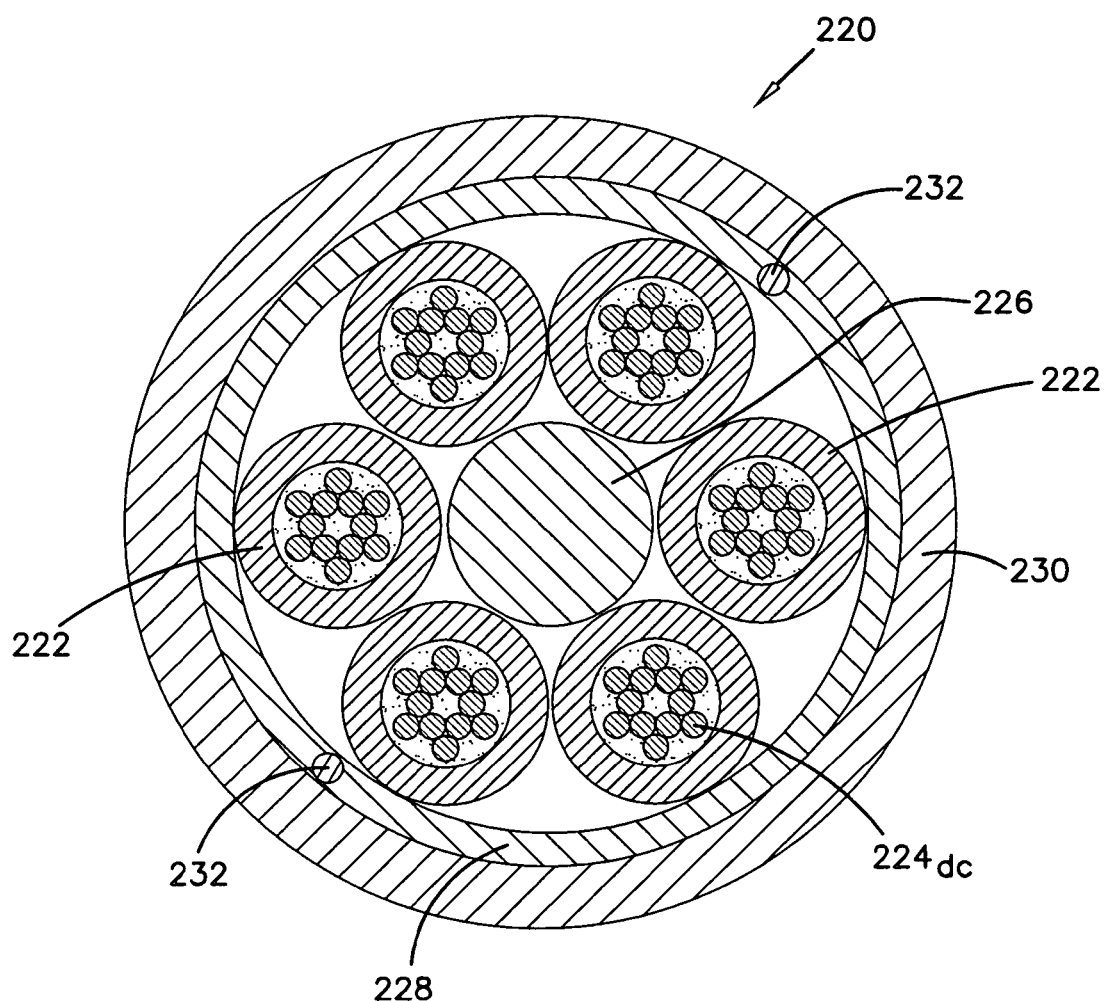
FIG. 3 is a cross sectional view of an example distribution cable.

For example, FIG. 3 shows an example distribution cable 220 including six separate buffer tubes 222 each containing twelve fibers $224_{dc}$. The buffer tubes 222 may be gel filled. The distribution cable 220 also includes a central strength member 226 for reinforcing the cable 220, and an outer strength layer/member 228 such as aramid fiber/yarn (e.g., Kevlar®) for also reinforcing the cable. The distribution cable 220 further includes an outer jacket 230 that encloses the buffer tubes 222. Ripcords 232 can be provided for facilitating tearing away portions of the jacket 230 to access the fibers $224_{dc}$ within the jacket 230.

The various aspects of the present disclosure are also applicable to distribution cables having fewer numbers of fibers (e.g., 2 or more fibers). For example, the distribution cable can include an outer jacket enclosing a single buffer tube and at least two strength members extending on opposite sides of the single buffer tube (not shown). An outer strength layer/member, such as aramid fiber/yarn, can surround the single buffer tube within the jacket. The single buffer tube can enclose loose fibers or ribbon fibers.

A tether (e.g., a drop cable or a stub cable) 240 branches out from the distribution cable 220 at the breakout location 260 (e.g., see FIG. 2). Typically, the outer jacket 230 of the distribution cable 220 is stripped to expose at least one of the buffer tubes 222 at a stripped region 350 (see FIG. 5). One or more tether fibers (e.g., typically less than twelve fibers) $224_t$ are preferably optically coupled (e.g., spliced) at a coupling location 205 to selected fibers $224_{dc}$ of the distribution cable 220 extending from one of the exposed buffer tubes 222. For clarity, only a single tether fiber $224_t$ and distribution cable fiber $224_{dc}$ are shown coupled together in the figures (e.g., see FIGS. 2 and 5). The opposite ends of the tether fibers $224_t$ are configured to optically couple to a drop terminal or other type of telecommunications equipment (not shown) offset from the breakout location 260. For example, the tether 240 can terminate in one or more fiber optic connectors 256 (e.g., see FIG. 14).

Figure 4:
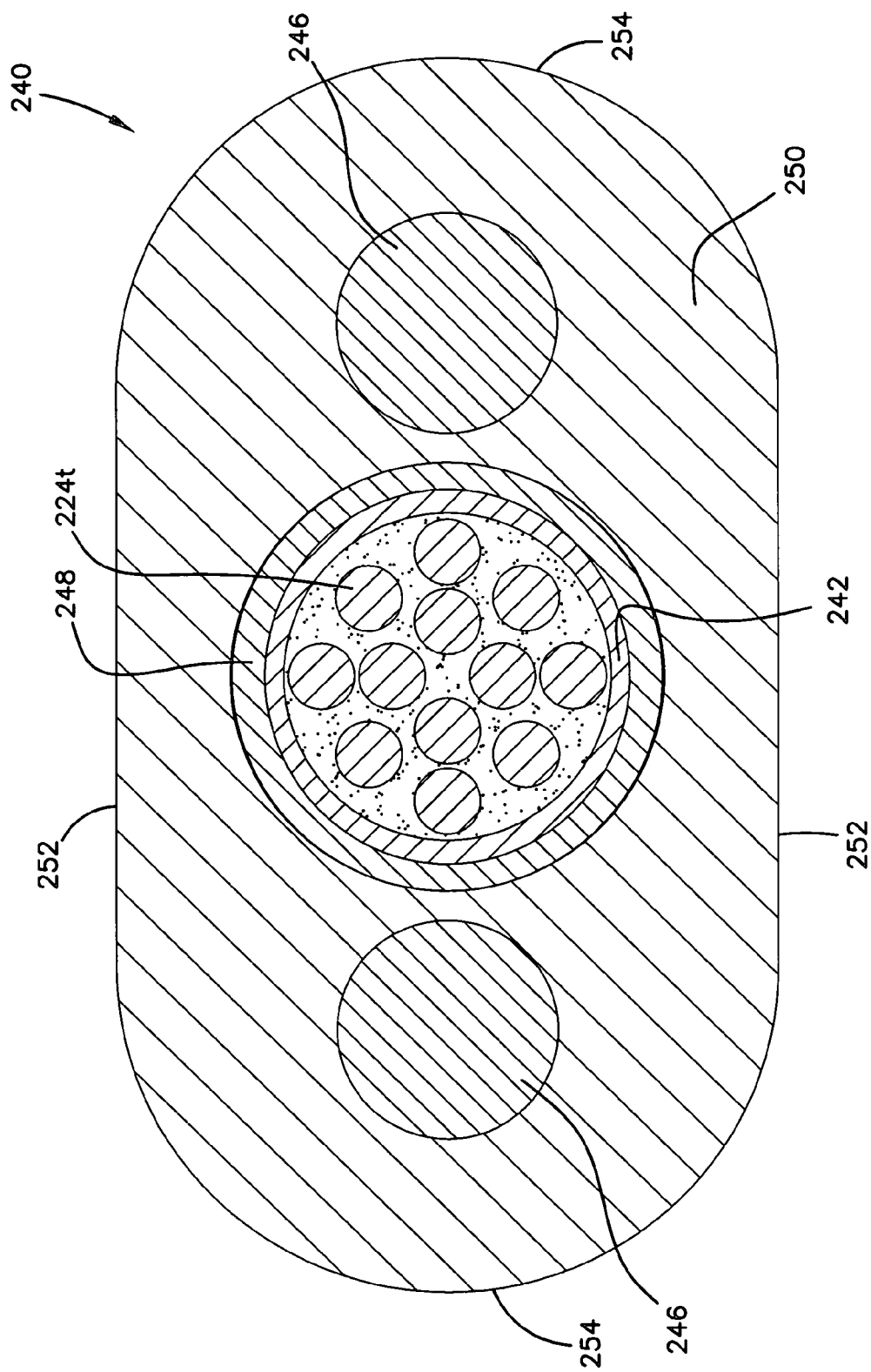
FIG. 4 is a cross sectional view of an example tether.

FIG. 4 illustrates a tether cable 240 configured to join to the distribution cable 220 at the breakout location 260. The tether 240 is depicted as having a flat cable configuration. The flat cable configuration includes a central buffer tube 242 containing a plurality of fibers $224_t$ (e.g., typically one to twelve loose or ribbonized fibers). Strength members 246 (e.g., flexible rods formed by glass fiber reinforced epoxy) are positioned on opposite sides of the central buffer tube 242. An outer jacket 250 surrounds the strength members 246 and the buffer tube 242.

In the example shown, the outer jacket 250 includes an outer perimeter having an elongated transverse cross-sectional shape. An additional strength layer 248 (e.g., aramid fiber/yarn) can be positioned between the buffer tube 242 and the outer jacket 250. As shown at FIG. 4, the transverse cross-sectional shape includes oppositely positioned, generally parallel sides 252 interconnected by rounded ends 254. However, any suitable cable configuration can be utilized for both the distribution cable and the tether cable.

Referring now to FIG. 5, a breakout assembly 200 having features that are examples of inventive aspects in accordance with the principles of the present disclosure is shown installed on the distribution cable shown in FIG. 2. The breakout assembly 200 includes a sleeve 202 mounted over the coupling location 205. An optional protective tube 280 can also be provided over the fibers 224 and the sleeve 202. An enclosure 300 surrounds the coupled optical fibers $224_{dc}$, $224_t$, the sleeve 202, the optional tube 280, and the exposed buffer tubes 222 of the distribution cable 220. The enclosure 300 can include an overmold.

In general, one end 302 of a body 310 of the enclosure 300 extends over the distribution cable 220 adjacent a first end 352 of the stripped region 350 and the other end 304 of the body 310 extends over the tether cable 240 and the distribution cable 220 adjacent a second end 354 of the stripped region 350. The tether 240 generally extends outward a length from the enclosure 300 to a connection end 256. In some embodiments, the length of the tether 240 ranges from about five feet to about fifty feet.

When the tether 240 is secured to the distribution cable 220, the tether 240 should preferably be able to withstand a pullout force of at least one hundred pounds. To meet this pullout force requirement, the breakout assembly 200 also includes a retention block 270 (see FIG. 6) configured to strengthen the mechanical interface between the tether 240 and the distribution cable 220. Typically, the retention block 270 is enclosed within the protective enclosure 300. As shown at FIG. 6, the retention block 270 includes a base 274 and a cover 272 between which the fiber $224_t$ of the tether 240 extends. First and second protrusions 276, 278 extend from the cover 272 and base 274, respectively. In one embodiment, the retention block 270 has a polycarbonate construction. Further details regarding the retention block 270 can be found in U.S. provisional application Ser. No. 60/781,280, filed Mar. 9, 2006, and entitled "FIBER OPTIC CABLE BREAKOUT CONFIGURATION," the disclosure of which is hereby incorporated by reference.

It is preferred for the fibers $224_t$ of the tether to be pre-terminated to the fibers $224_{dc}$ of the distribution cable. "Pre-terminated" means that the fibers $224_t$ are fused or otherwise connected to the fibers $224_{dc}$ of the distribution cable 220 at the factory as part of the cable manufacturing process rather than being field terminated. The remainder of the breakout assembly 200 is also preferably factory installed.

Figure 7:
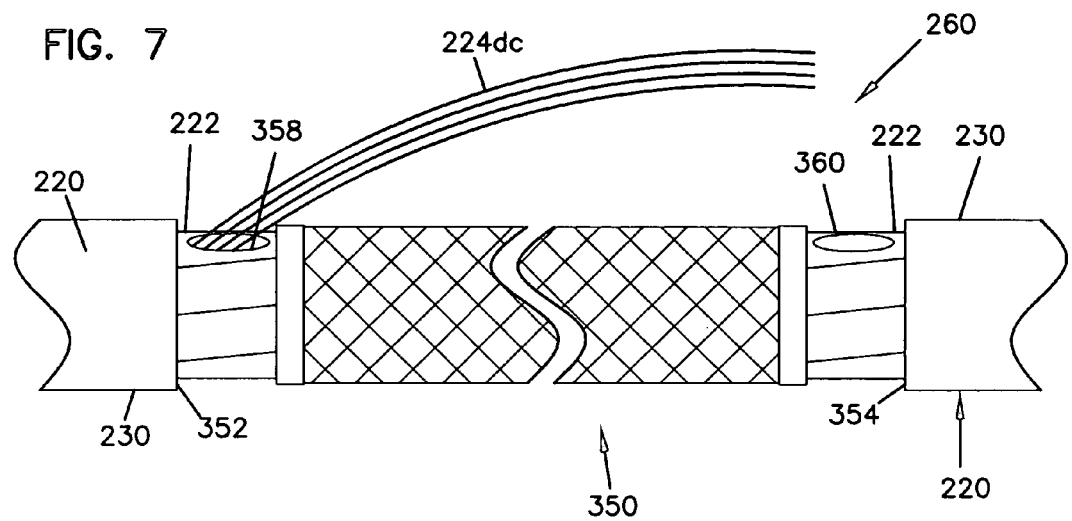
FIG. 7 shows an initial preparation of the distribution cable at the mid-span breakout location of FIG. 5.

Referring to FIG. 7, to prepare the mid-span breakout location 260 on the distribution cable 220, a portion of the outer jacket 230 is first stripped away to provide the stripped region 350. In certain embodiments, portions of a cable netting can be removed adjacent the first and second ends 352, 354, respectively, so that the buffer tubes 222 are exposed (FIG. 7). The outer strength layer/member 228 can also be displaced (e.g., bunched at one side of the cable 220) adjacent the ends 352, 354 to facilitate accessing the buffer tubes 222 (see, e.g., FIG. 5). Tape can be used to prevent the intermediate length of netting that remains at the mid-span breakout location 260 from unraveling (FIG. 7).

One of the buffer tubes 222 is selected and a first window 358 is cut into the selected buffer tube 222 adjacent the first end 352 of the stripped region 350 and a second window 360 is cut into the selected buffer tube 222 adjacent the second end 354 of the stripped region 350. The fibers $224_{dc}$ desired to be broken out are accessed and severed at the second window 360. After the fibers $224_{dc}$ have been severed, the fibers $224_{dc}$ are pulled from the buffer tube 222 through the first window 358. With the distribution cable 220 prepared as shown in FIG. 7, the fibers $224_{dc}$ are ready to be terminated to a pre-pared tether 240.

Figure 8:
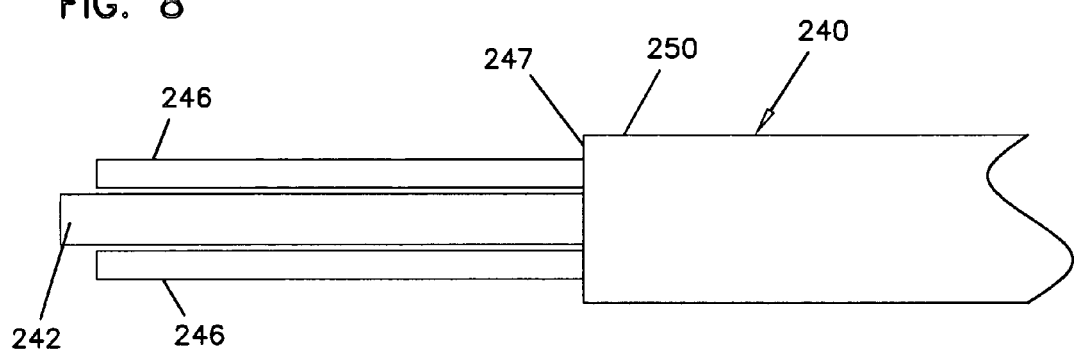
FIG. 8 shows a first preparation step for a tether used at the mid-span breakout location of FIG. 5.
Figure 9:
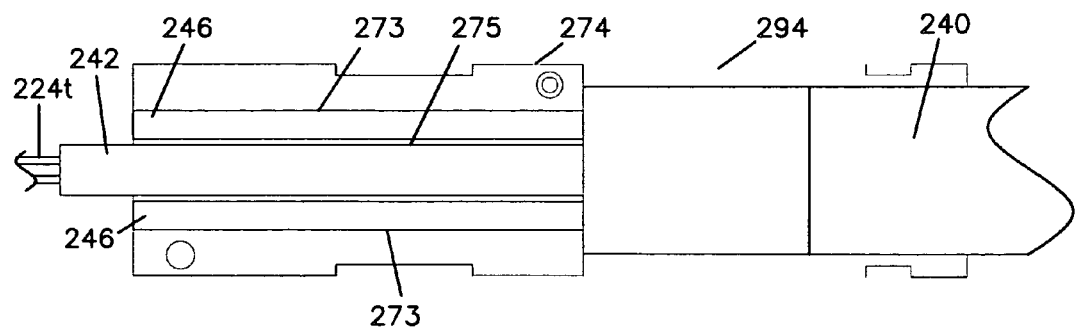
FIG. 9 shows a subsequent preparation step of the tether of FIG. 8.

To prepare the tether 240 to be installed on the prepared distribution cable 220, a portion of the outer jacket 250 is stripped away to expose the central buffer tube 242 and the strength members 246 (see FIG. 8). As shown at FIG. 8, the central buffer tube 242 and the strength members 246 project outwardly beyond an end 247 of the outer jacket 250. The strength layer 248 (FIG. 4) has been removed from around the buffer tube 242. After removing the end portion of the outer jacket 250, the strength members 246 are trimmed as shown at FIG. 8, and an end portion of the central buffer tube 242 is removed to expose the fibers $224_t$ (FIG. 9).

To connect the tether fibers $224_t$ to the distribution cable fibers $224_{dc}$, the sleeve 202 (FIG. 5) is first slid over the fibers $224_t$ of the tether. In certain embodiments, the sleeve 202 can be slid up over the buffer tube 242 of the tether 240. The optional protective tube 280 (FIG. 5) is also slid over the tether 240. With the sleeve 202 and tube 280 are mounted on the tether 240, the fibers $224_t$ of the tether 240 are fused to the fibers $224_{dc}$ of the distribution cable 220. After the fusion process is complete, the sleeve 202 can be slid over the fusion location 205 to protect the fused fibers $224_t$, $224_{dc}$. The tube 280 can be slid over the sleeve 202. The fibers are then tested to confirm that the fibers meet minimum insertion loss requirements.

The tether 240 can then be mounted to the retention block 270. For example, as shown at FIG. 9, the strength members 246 can be positioned within side grooves 273 on the base 274 of the retention block 270, and the central buffer tube 242 can be inserted within a central groove 275 on the base 274. In the example illustrated, the central buffer tube 242 has a length that extends beyond a first end of the base 274, and the strength members 246 have lengths that terminate generally at the first end of the base 274. After securing the retention block 270 to the distribution cable 220, one end of the optional protective tube 280 can be mounted over the protrusions 276, 278 of the retention block 270 (see FIG. 5).

After verifying insertion loss, heat resistant tape is wrapped around the mid-span breakout location 260. Thereafter, the enclosure 300 is applied over the taped mid-span breakout location 260 (see FIG. 5). The enclosure (e.g., an overmold layer) 300 seals and protects the underlying components of the breakout assembly 200. The tether 240 extends outwardly from the body 310 of the enclosure 300 to the tether connectors 256 spaced from the enclosure body 310.

It is preferred for the enclosure body 310 to be sized with a cross sectional shape sufficient to allow the breakout location 260 to be readily passed through a one and one-half inch inner diameter conduit or a one and one-quarter inch diameter conduit. In certain embodiments, the breakout location 260 has a cross sectional area that can be passed through a one inch inner diameter conduit.

The breakout location 260 is preferably configured to allow the mid-span breakout location to be bent/flexed in any orientation without damaging the fibers $224_{dc}$, $224_t$ and without significantly negatively affecting cable performance. For example, the enclosure 300 preferably has sufficient flexibility to allow the pre-terminated telecommunications cable (i.e., the distribution cable 220 with the tethers terminated 240 thereto) to be readily stored on a spool. In one embodiment, the pre-terminated cable can bend about 180 degrees.

In one embodiment, this flexibility is provided by making sure the fibers $224_{dc}$, $224_t$ have sufficient excess fiber length (i.e., slack) to allow the distribution cable 220 at the breakout location 260 to be bent/flexed the requisite amount. In one embodiment, the fibers $224_{dc}$, $224_t$ extending along the breakout location 260 are provided with at least 2% excess fiber length. In other embodiments, the fibers $224_{dc}$, $224_t$ are provided with at least 3% excess fiber length. In still other embodiments, the fibers $224_{dc}$, $224_t$ are provided with an excess fiber length in the range of 1 to 5% or in the range of 2 to 5%. In one example embodiment, the length of the breakout location 260 is about 32 centimeters and about 1 centimeter of excess fiber length is provided to the fibers $224_{dc}$, $224_t$ as they extend along the breakout location 260.

Figure 10:
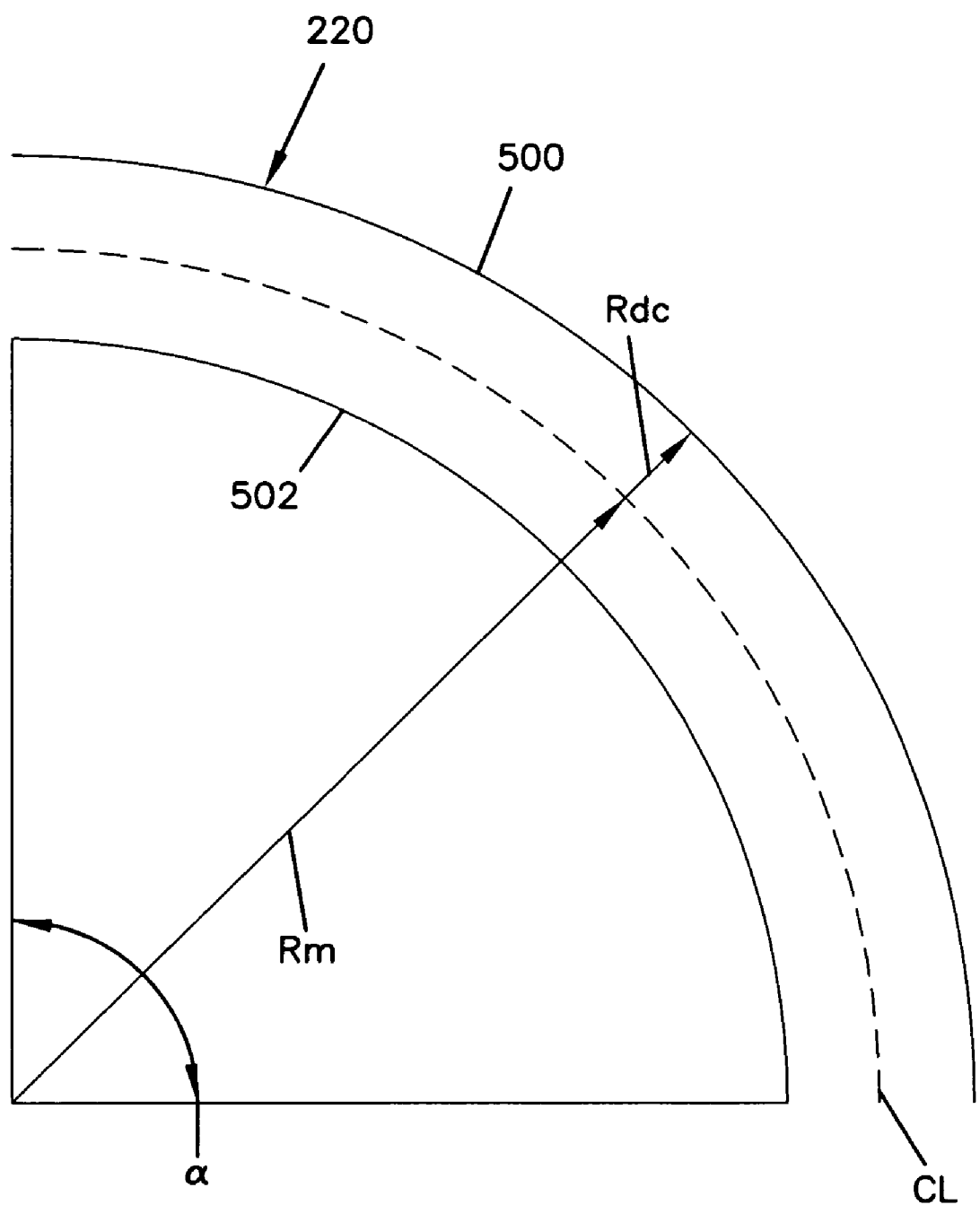
FIG. 10 is a schematic view showing a distribution cable bent along a 90 degree curve at a maximum bend radius.

In determining the amount of excess fiber length to be provided at the breakout location 260, it is desirable for the distribution cable 220 to be able to be bent in a minimum bend radius $R_m$ in any orientation without compromising the mid-span breakout assembly 200. In one embodiment, an example minimum bend radius $R_m$ is ten times the outer diameter of the distribution cable 220. When the distribution cable is flexed to a bend having a radius $R_m$ as shown at FIG. 10, a portion 500 of the distribution cable 220 at the outside of the curve elongates and a portion 502 of the distribution cable at the inside of the curve shortens. The centerline CL of the distribution cable does not change in length. Taking the above factors into consideration, the amount of slack fiber length required to accommodate the elongation at the outer portion 500 of the bend can be calculated by the following formula:

$$\alpha \frac{\pi}{180°}(R_m + R_{dc}) - \alpha \frac{\pi}{180°} R_m = \alpha \frac{\pi}{180°} R_{dc}$$

In the above formula, where $R_{dc}$ equals the outer radius of the distribution cable measured from the centerline CL to the outer surface of the outer jacket. $R_{dc}$ provides a value that is representative of the distance between the fibers $224_{dc}$, $224_t$ and the centerline CL of the distribution cable 200. The angle of the bend is represented at $\alpha$ in degrees. For a 90° bend, the excess fiber length equals at least $\pi R_{dc}/2$. For a 180° bend, the excess fiber length equals $\pi R_{dc}$.

Figure 11:
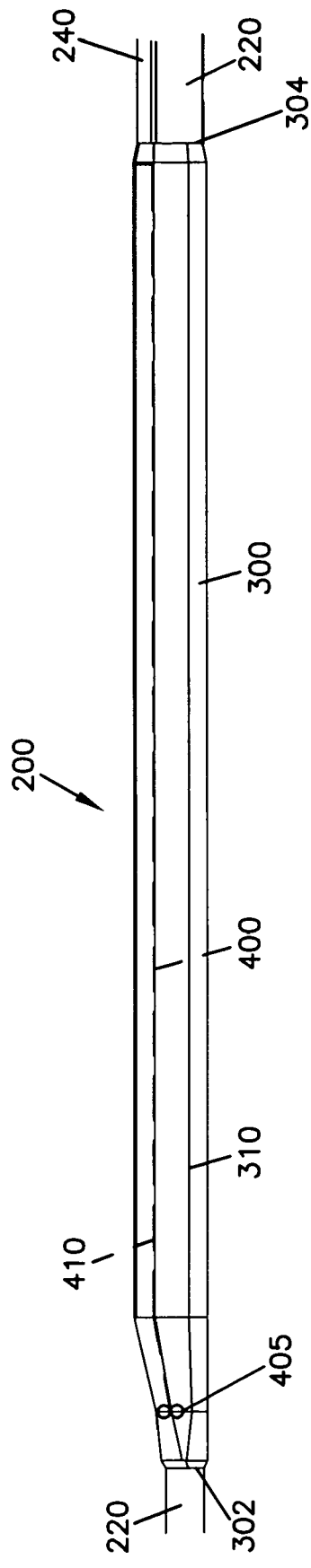
FIG. 11 is a side view of an access device installed in an enclosure.
Figure 12:
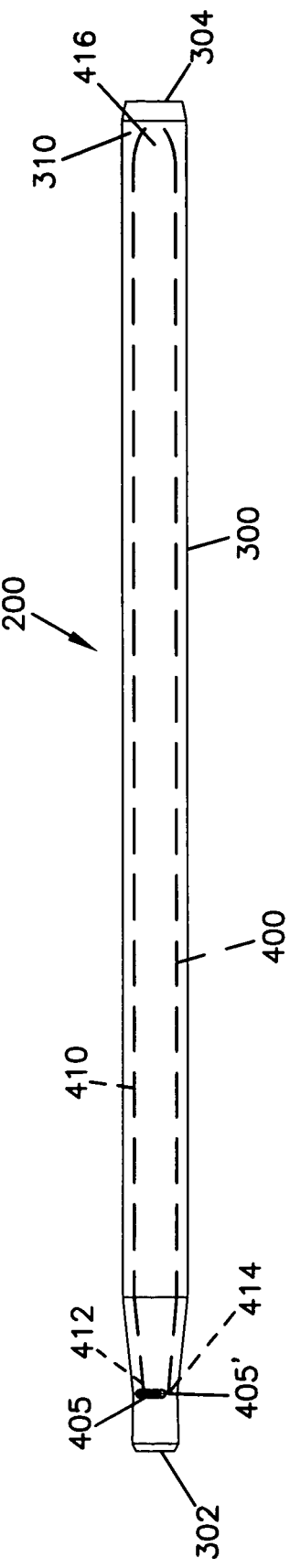
FIG. 12 is a top view of the access device and the enclosure of FIG. 11.

Referring now to FIGS. 11-12, an access device 400 can be installed at the mid-span breakout location 260 to facilitate accessing the breakout assembly 200 after providing the enclosure 300. Typically, the access device 400 is installed at the factory. For example, a ripcord 410 can be embedded within the body 310 of the enclosure 300 or underneath the enclosure 300 when the tether 240 is being installed on the distribution cable 220.

The ripcord 410 extends from a first end 412 to a second end 414 (FIG. 12). The ripcord 410 is arranged to cut or otherwise open the body 310 of the enclosure 300 when pulled. In certain embodiments, the ripcord 410 is arranged so that the first end 412 is embedded adjacent the first end 302 of the enclosure body 310 and the second end 414 of the ripcord 410 is also embedded adjacent the first end 302. In such embodiments, the ripcord 410 extends from the first end 302 of the enclosure body 310 to the second end 304 and loops back to the first end 302, forming a half-loop 416 (FIG. 12). In other embodiments, the first end 412 of the ripcord 410 is embedded adjacent the first end 302 of the enclosure body 310 and the second end 414 of the ripcord 410 is embedded adjacent the second end 304 of the body 310.

Figure 14:
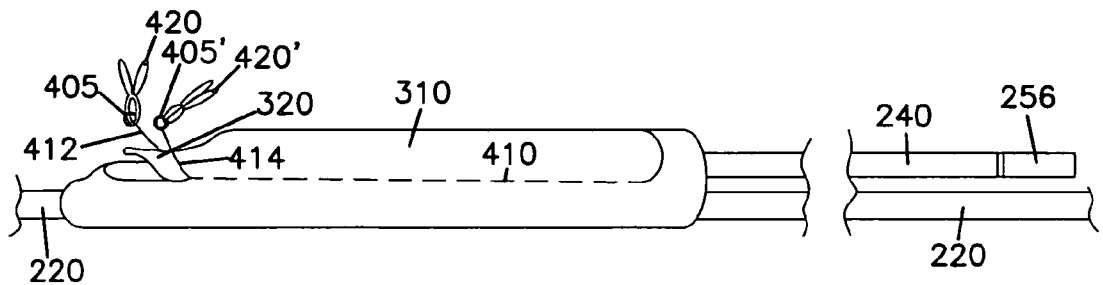
FIG. 14 is a perspective view of the enclosure of FIG. 11 after the ripcord has been accessed.

In certain embodiments, a ring 405 is attached to at least one of the ends 412, 414 of the ripcord 410. Typically, rings 405, 405' are attached to the first end 412 and the second end 414, respectively (FIG. 14). In general, the rings 405, 405' are sized to enable a user to grasp the rings 405, 405' with a tool, such as pliers (FIG. 14). In one embodiment, an example ring 405 is about $\frac{1}{8}^{th}$ of an inch in diameter. In other embodiments, however, the rings 405 can be sized to be grasped by a human hand. The rings 405, 405' can also be embedded within the enclosure body 310. Typically, in such embodiments, notches or other indicia are provided on the enclosure body 310 adjacent the rings 405, 405' to indicate the location of the rings 405, 405'.

Figure 13:
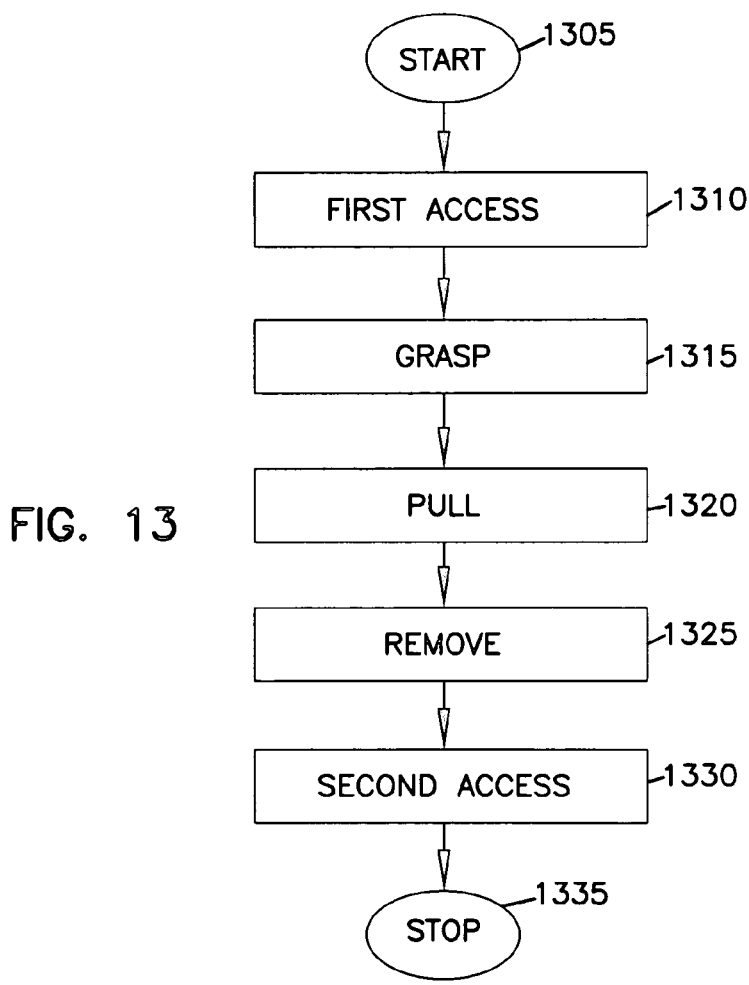
FIG. 13 is a flowchart illustrating a process for accessing a breakout assembly within an enclosure.

FIG. 13 illustrates an operational flow for a process 1300 by which a user can use an access device, such as access device 400, to access a breakout assembly, such as breakout assembly 200, through an enclosure, such as enclosure 300. The process 1300 begins at start module 1305 and proceeds to a first access operation 1310. At the first access operation 1310, a user determines the location of the rings. In certain embodiments, the user cuts the enclosure body at an indicated location to provide access to the embedded rings. In one embodiment, the user makes two cuts in the body per ring.

In a grasp operation 1315, the user grips the exposed rings. In some embodiments, the user grasps the exposed rings with his hands. In other embodiments, however, the user grasps the exposed rings with a tool, such as pliers. Generally, in the grasp operation 1315, the user grips a ring attached to each end of a ripcord.

For example, as shown in FIG. 14, a ripcord 410 extends embedded along an enclosure body 310. Rings 405, 405' are provided at the ends 412, 414, respectively, of the ripcord 410. Both rings 405, 405' are positioned adjacent the first end 302 of the enclosure body 310. In other embodiments, however, the rings 405, 405' can be arranged at the opposite side 304 of the enclosure body 310 or on opposite sides of the body 310. Tools 420, 420', can be used to grip the rings 405, 405', respectively. In the example illustrated, the tools 420, 420' are needlenose pliers.

Referring back to FIG. 13, the process 1300 proceeds to a pull operation 1320, in which a user applies a force to the rings to draw the ripcord out of the enclosure body. For example, in one embodiment, the pull operation 1320 can pull the rings away from one another in opposite directions. In another embodiment, the pull operation 1320 spins (i.e., or twirls) the tools gripping the rings to draw the ripcord out of the enclosure body. In yet another embodiment, the pull operation 1320 holds one of the rings still and pulls the other ring, thereby drawing the ripcord out of the enclosure one side at a time.

The ripcord cuts out a portion from the enclosure body while being drawn out of the body during the pull operation 1320. A remove operation 1325 flips or curls the cut portion of the body out of the way. In certain embodiments, the remove operation 1325 is performed concurrently with the pull operation 1320. In other embodiments, the remove operation 1325 is performed when the pull operation 1320 has been completed. Cutting and removing a portion from the enclosure body yields an elongated void through which the breakout assembly of the telecommunications cable can be accessed.

Figure 15:
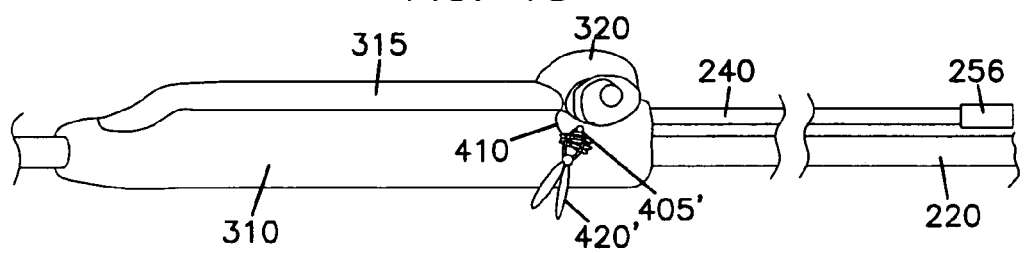
FIG. 15 is a perspective view of the enclosure of FIG. 11 after the ripcord has partially cut open the enclosure.

The results of the pull operation 1320 and the remove operation 1325 are shown in FIG. 15. The ripcord 410 cut a portion 320 from the enclosure body 310 when being pulled out of the body 310. In particular, FIG. 15 illustrates an enclosure 300 in which most of the ripcord 410 has been pulled out of the body 310. The ring 405' and one end 414 of the ripcord 410 is shown gathered (e.g., wrapped) around a tool 420'. Pulling out the ripcord 410 cuts the body 310 yielding an elongated void 315 where the portion 320 is severed from the body 310. The void 315 provides access to the interior of the enclosure 300.

In some embodiments, the process 1300 proceeds to a second access operation 1330 after a significant portion of the enclosure body has been cut and removed. In other embodiments, the process 1300 proceeds only when the ripcord and the cut portion have been fully removed from the enclosure body. In the second access operation 1330, the user accesses the breakout assembly, the distribution cable, or the tether through the void in the enclosure body. For example, repair, maintenance, and/or improvement can then be made to the breakout assembly. The process 1300 ends at stop module 1335.

After the breakout assembly has been accessed, the enclosure can be resealed. In one embodiment, the cut portion is chemically or mechanically welded to the enclosure body at the void. For example, in FIG. 15, the cut portion 320 can be resealed to the enclosure 300, thereby covering the void 315, with a heat gun. In certain embodiments, a new access device can be installed through the void prior to resealing the body. In other embodiments, a box or other closure means can be installed around the breakout location.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A telecommunications cable comprising:
a distribution cable including a cable jacket and at least a first buffer tube positioned within the cable jacket, the distribution cable including a breakout location where a portion of the cable jacket has been removed and where the first buffer tube includes a fiber access location;
an enclosure enclosing the breakout location, the enclosure including a body elongated over a length that extends along the distribution cable from a first end to a second end of the enclosure;
a tether branching from the distribution cable at the breakout location, the tether including a tether jacket;
an optical fiber structure including a first portion that extends through the first buffer tube of the distribution cable, a second portion that extends through the fiber access location and along the length of the enclosure, and a third portion positioned within the tether jacket, the first, second, and third portions of the optical fiber structure being in optical communication with one another; and
an access device including a ripcord installed on the enclosure, the ripcord extending from a first end to a second end, the first and second ends of the ripcord arranged adjacent the first end of the enclosure, the ripcord forming a half-loop adjacent the second end of the enclosure, the ripcord being configured to cut through the body of the enclosure when pulled.

2. The telecommunications cable of claim 1, wherein the access device also includes a ring coupled to at least one of the first and second ends of the ripcord.

3. The telecommunications cable of claim 2, wherein the ring is about $1/8^{th}$ of an inch in diameter.

4. The telecommunications cable of claim 2, wherein the ring is embedded within the body of the enclosure.

5. The telecommunications cable of claim 4, wherein the body of the enclosure includes indicia indicating a location of the ring.

6. The telecommunications cable of claim 1, wherein the first end and the second end of the ripcord are each coupled to first and second rings, respectively.

7. The telecommunications cable of claim 6, wherein each ring is sized and configured to be grasped by a tool.

8. The telecommunications cable of claim 1, wherein the enclosure is formed from a polymeric material.

9. The telecommunications cable of claim 1, wherein the telecommunications cable is sized to be pulled through a conduit having a 1.25 inch inner diameter.

10. The telecommunications cable of claim 1, further comprising a sleeve through which the second portion of the optical fiber structure passes, the sleeve being encased within the enclosure.

11. The telecommunications cable of claim 10, wherein the first portion of the optical fiber structure is defined by a distribution cable fiber positioned within the first buffer tube of the distribution cable, and wherein the third portion of the optical fiber structure is defined by a tether fiber positioned within the tether jacket, and wherein the second portion of the optical fiber structure is defined by optically coupled end portions of the distribution cable fiber and the tether fiber.

12. The telecommunications cable of claim 1, wherein the enclosure is installed on the distribution cable in a factory.

13. A method comprising:
accessing a first end and a second end of a ripcord installed within a body of an enclosure, the enclosure installed on a distribution cable at a breakout location;
applying a force to the first end and to the second end of the ripcord to pull the ripcord from the body, wherein pulling the ripcord cuts the body of the enclosure;
removing a portion cut from the body of the enclosure to create a void leading to an interior of the enclosure; and
accessing a breakout assembly installed on the distribution cable at the breakout location; and
resealing the body of the enclosure to close the void.

14. The method of claim 13, wherein accessing a first end and a second end of a ripcord includes grasping a ring coupled to each of the first and second ends.

15. The method of claim 14, wherein applying a force includes pulling the rings in opposite directions.

16. The method of claim 13, wherein applying a force includes wrapping at least one of the first and second ends of the ripcord around a tool.

17. The method of claim 13, wherein applying a force includes applying a force to the first end and to the second end of the ripcord concurrently.

18. The method of claim 13, wherein sealing the cut portion includes mechanically welding the cut portion to the body of the enclosure using a heat gun.

19. An access device for accessing an interior of an enclosure installed on a distribution cable at a breakout location, the access device comprising:
a ripcord extending from a first end to a second end, the first end and the second end being embedded within the enclosure at a first end of the enclosure, the ripcord forming a half-loop within the body of the enclosure, the ripcord configured to cut through the enclosure when a force is applied to at least one of the first and second ends of the ripcord;
a first ring coupled to the first end of the ripcord, the first ring embedded in the enclosure at the first end of the enclosure; and
a second ring coupled to the second end of the ripcord, the second ring embedded in the enclosure adjacent the first ring.

20. A telecommunications cable comprising:
a distribution cable including at least a first buffer tube, the distribution cable including a breakout location where the first buffer tube includes a fiber access location;
an enclosure that encloses the breakout location, the enclosure including a body that extends along the distribution cable;
a tether branching from the distribution cable at the breakout location and extending out from the enclosure, the tether including a tether jacket and a connectorized end, the connectorized end spaced a distance from the enclosure;
an optical fiber structure including a first portion that extends through the first buffer tube of the distribution cable, a second portion that extends through the fiber access location and along the length of the enclosure, and a third portion positioned within the tether jacket, the first, second, and third portions of the optical fiber structure being in optical communication with one another; and
an access device including a ripcord, the ripcord extending along at least a portion of the body of the enclosure to form a half-loop, the ripcord being configured to cut through the body of the enclosure when pulled.

21. The telecommunications cable of claim 20, wherein the ripcord is provided within the enclosure.

* * * * *